United States Patent [19]

Jahns et al.

[11] Patent Number: 4,743,828
[45] Date of Patent: May 10, 1988

[54] ELECTRIC DRIVE SYSTEM

[75] Inventors: Thomas M. Jahns, Schenectady, N.Y.; Vytautas Janonis, Cleveland, Ohio

[73] Assignee: Gould Inc., Rolling Meadows, Ill.

[21] Appl. No.: 795,691

[22] Filed: Nov. 6, 1985

Related U.S. Application Data

[63] Continuation-in-part of Ser. No. 659,508, Oct. 10, 1984, abandoned, which is a continuation of Ser. No. 298,550, Sep. 2, 1981, abandoned.

[51] Int. Cl.$^4$ .................................................. H02P 5/40
[52] U.S. Cl. ................................... 318/810; 310/184; 363/43; 440/6
[58] Field of Search .......................... 318/803, 807–811; 363/71, 72, 40, 43, 45, 37; 310/184, 185, 188, 198, 72; 440/6, 7; 114/20 R, 20 A; 307/58

[56] References Cited

U.S. PATENT DOCUMENTS

| | | | |
|---|---|---|---|
| 1,701,350 | 2/1929 | Alexanderson | 440/6 |
| 3,274,482 | 9/1966 | Depenbrok | 307/58 |
| 3,477,010 | 11/1969 | Venard | 363/43 |
| 3,603,866 | 9/1971 | Opal | 318/810 |
| 3,611,085 | 10/1971 | Rosenberry, Jr. | 318/813 |
| 3,775,662 | 11/1973 | Compoly et al. | 363/43 |
| 3,792,286 | 2/1974 | Meier | 307/58 |
| 3,876,923 | 4/1975 | Humphrey et al. | 363/40 |
| 4,006,391 | 2/1977 | Deering et al. | 318/811 |
| 4,117,364 | 9/1978 | Baker | 363/43 |
| 4,220,881 | 9/1980 | Hamilton et al. | 310/184 |
| 4,532,458 | 7/1985 | Kuznetsov et al. | 318/748 |

OTHER PUBLICATIONS

Laithwaite et al, "Development of an Induction Machine Commutated Thyristor Invertor for Traction Drives", Natural Commutation of Current-Source Thyristor Inverters by Cage-Rotor Induction Machines", Conference, IAS Annual Meeting, 1980 Cincinnati, OH, Sep. 28–Oct. 3, 1986, pp. 580–585, pp. 897–902.

Laithwaite et al, "The Asynchronous Condenser: A Brushless, Adjustable Power Factor Induction Machine", 11-20-79.

Peak, Steven C., et al, "Transistorized PWM Inverter-Induction Motor Drive System", IEEE Ind. Appl. Soc. Meet., 1982, pp. 892–898.

*Primary Examiner*—David Smith, Jr.

[57] ABSTRACT

An electric drive system uses a multiphase alternating current motor and inverter to convert power from a battery source to provide propulsion. The phase sets defined by the motor stator winding are excited by a corresponding plurality of inverters. Time harmonic currents in the windings are effectively suppressed by providing the drive motor in a configuration having high leakage inductance in the stator winding. The windings are arranged in sets of multiples of three-phase windings. In the illustrated embodiment, the inverters are arranged to define three-phase inverters for exciting m sets, where m≧2, of three-phase windings of the motor stator. The number of multiphase winding sets is determined in a manner that eliminates the need for paralleling of inverter switching devices.

12 Claims, 3 Drawing Sheets

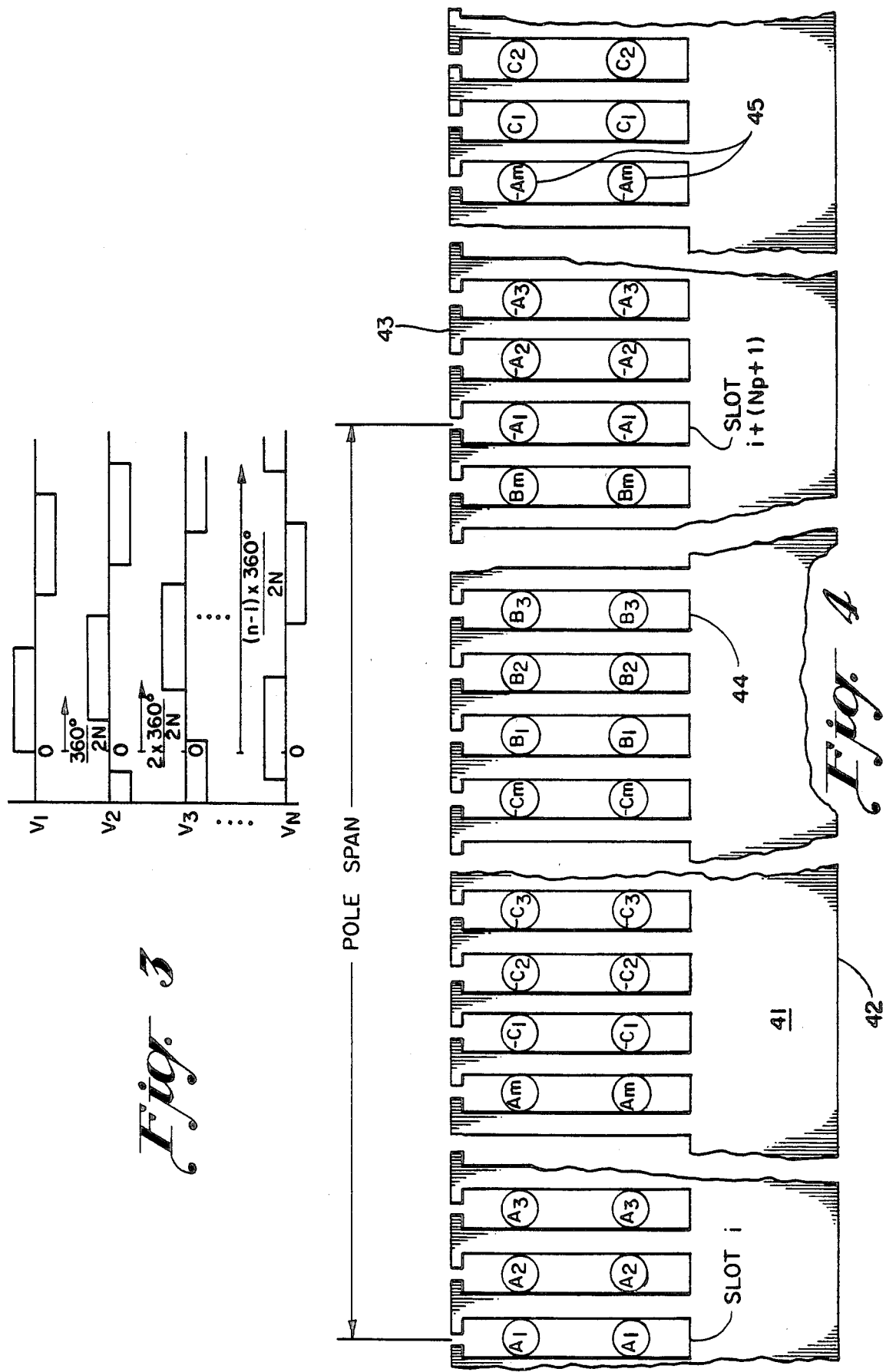

ELECTRIC DRIVE SYSTEM

RELATED U.S. APPLICATION DATA

This application is a continuation-in-part of U.S. patent application Ser. No. 659,508 filed Oct. 10, 1984 now abandoned, which was a continuation of Ser. No. 298,550 filed Sept. 2, 1981 now abandoned.

BACKGROUND OF THE INVENTION

This invention relates generally to electric drive systems, and more particularly to drive systems using multi-phase alternating current (AC) motors.

One conventional electric drive application is the propulsion drive of underwater vehicles and the like. In such application, it is desirable to provide quiet propulsion at high power densities. It has further been conventional in electric propulsion systems to use direct current motors as the means for driving the propeller.

Because of increasing power requirements, it has been found desirable to use alternating current motors in lieu of the limited capacity direct current motors previously used. One proposed application of such alternating current motor drives uses a three-phase squirrel-cage induction motor excited by a three-phase half-bridge inverter connected to the battery power supply. It has been further proposed that such motors use a conventional three-phase winding configuration and that the inverters be arranged to provide three-phase, variable-frequency, variable-amplitude alternating current power to the motors. It is further proposed that amplitude control may be achieved by means of pulse width modulators.

In the proposed controls for use with such three-phase drive motors, power transistors are used as switching devices to reduce the weight of the propulsion system by eliminating the need for forced commutation circuitry and hardware. However, such available transistor devices are limited in the power switching capabilities and have been found to be inadequate to provide the desired propulsion system power levels at the present time. As a result, in the proposed systems, paralleling of transistors is necessitated to provide sufficient inverter power rating. Such paralleling of power transistors causes a number of serious technical problems. Because of the exacting weight and space requirements in electric propulsion vehicles, the use of additional equipment to prevent unequal current sharing among the parallel transistor devices has been a serious problem.

Another problem encountered in the three-phase motor drives used heretofore has been the production of substantial harmonic currents which cause pulsating torque components in the motor rotor which, in the prior art devices, may have amplitudes which are a substantial fraction of the average torque output of the system. Such harmonic currents result from the inverter delivering nonsinusoidal excitation waveforms to the motor. Thus, the three-phase half-bridge inverters conventionally employed deliver quasi-square wave (preferred to hereinafter as "six-step") voltage waveforms under the full speed and full power conditions. The pulsating torque developed by the harmonic currents is conventionally delivered directly to the speed reducing gear means in the drive system, which adversely affects the gear life and increases system noise due to gear chatter. The excitation harmonic currents further contribute to a substantial increase in the rotor losses in the drive motor, reducing the capability of the drive systems and presenting heat removal problems from the rotor assembly, which is desirably designed to be as compact as possible.

The problem of motor rotor torque pulsation has been treated by Rosenberry in U.S. Pat. No. 3,611,085 by using a plurality of electrically separate polyphase motor windings supplied by a plurality of inverters. Harmonic phase current content is directly related to the peak value of motor phase current. The limiting inverter switching device operating constraint is the peak value of the motor phase current. Inverter-driven motor configurations of the type described by Rosenberry will successfully treat torque pulsation but do not inherently suppress the 5th and 7th harmonic phase currents, and therefore, do not inherently limit peak motor phase current.

The suppression of motor phase current time harmonics, principally the 5th and 7th orders, was the goal of Meier (U.S. Pat. No. 3,792,286) and Hamilton (U.S. Pat. No. 4,220,881). The use of inductive reactors external to the motor, as described by Meier, would be extremely detrimental to propulsion system performance due to the large increase in drive train weight attributable to the reactors. This approach to harmonic suppression is, therefore, a very unattractive technical option. Hamilton has suggested a multiphase winding arrangement which provides a degree of harmonic suppression which is greater than prior practice, as described by the inverter-driven motors of the type employed in the practice of Rosenberry. The winding arrangement chosen was well suited for the particular number of phases discussed, but is not the best possible for any arbitrary number of phases.

Therefore, it is an object of the present invention to provide an electric drive system having improved reliability, efficiency, smooth torque production, and a high power to weight ratio.

It is another object of the invention to provide an electric drive system using an AC motor which provides optimal suppression of stator phase current harmonics in drive systems which do not employ inductive reactors external to the motor.

It is yet another object of the invention to provide an electric drive system which eliminates the need for paralleling of inverter switching devices.

Additional objects, advantages, and novel features of the invention will be set forth in part in the description which follows, and in part will become apparent to those skilled in the art upon examination of the following or may be learned by practice of the invention.

SUMMARY OF THE INVENTION

To achieve the foregoing and other objects an electric drive system may comprise: a DC power source; a multiphase AC motor, the motor having N stator winding phases, where N is a multiple of three, and m stator winding sets, where m is at least two and where each set includes three phases separated by 120 electrical degrees; the winding sets being constructed to provide the highest possible value of stator slot leakage inductance per phase for a given stator geometry; a plurality of inverters connected one each to the winding sets from the DC power source; means for controlling the inverters to excite the winding sets successively; and a propulsion means driven by the motor.

The motor is configured so that the magnetic axes of the stator phase windings are spaced at equal intervals along the inner periphery of the motor stator. Current is delivered to the drive motor from a corresponding plurality of inverters connected one each to the motor winding sets from the power supply for exciting the windings successively. Preferably the winding sets are displaced at 360/N or 360/2N electrical degrees from one another to provide excitation at intervals of 360/N or 360/2N electrical degrees. By constructing the stator winding sets to provide the highest value of stator slot leakage inductance per phase for a given stator geometry, harmonic currents are effectively suppressed in the windings without the need for external magnetics. The number of sets, m, of three-phase windings is selected such that the peak current limit of the inverter switching devices is not exceeded, thereby, eliminating the need for paralleling switching devices in drives designed at the power levels required for electric propulsion. Each stator winding set can be arranged in wye or delta configuration. Preferably, the controlling means includes a plurality of switches, the switches being connected such that no more than one switch is conducting per phase at any given time.

BRIEF DESCRIPTION OF THE DRAWING

Other features and advantages of the invention will be apparent from the following description taken in connection with the accompanying drawings wherein:

FIG. 3 is a waveform diagram illustrating the line-to-line motor excitation voltage waveforms for the multi-phase system illustrated in FIG. 2;

FIG. 4 is a horizontal development of an alternating current drive motor stator assembly. The drawing illustrates the location of winding coil sides in a general double layer multiphase winding composed of m three-phase sets;

DESCRIPTION OF THE PREFERRED EMBODIMENT

Figure 1:
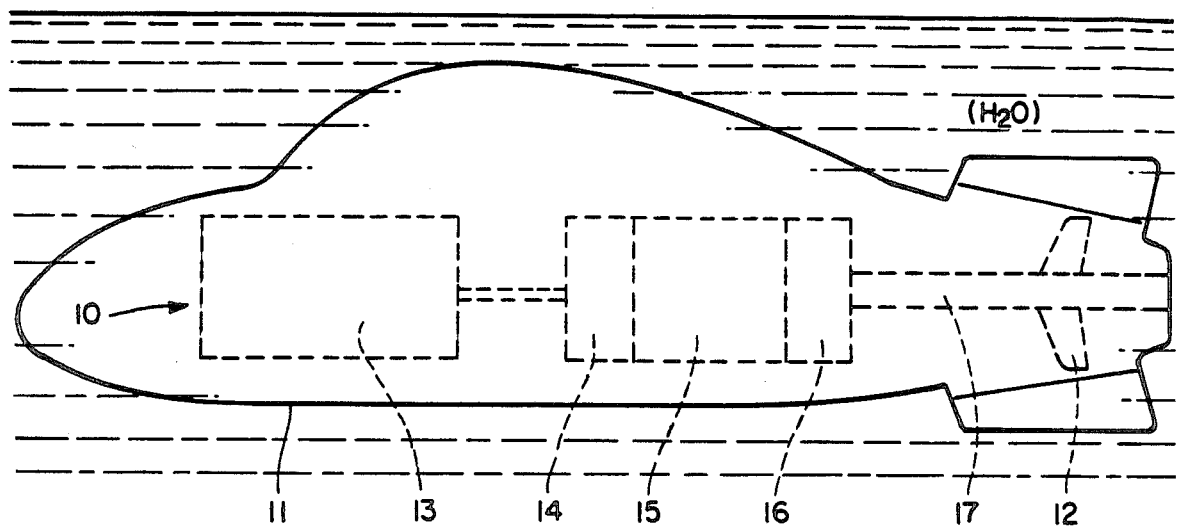
FIG. 1 is a fragmentary elevation of a marine device having a drive system embodying the invention.

In the illustrative embodiment of the invention as disclosed in FIG. 1, electric drive system 10 is shown for use in the propulsion system of an underwater vehicle. The present drive is advantageously adapted for use in such an application in providing a high power-to-weight ratio, low-noise drive.

The drive system drives the propeller 12 from a direct current power supply defined by battery 13. The direct current power of the battery 13 is connected by an inverter device 14 to operate a multiphase alternating current motor 15 connected through a speed reducer 16 and propeller shaft 17 to the propeller 12.

Drive motor 15 defines multiple stator windings and inverter 14 defines a corresponding plurality of inverters connected one each to the winding sets for exciting and windings successively.

Figure 2:
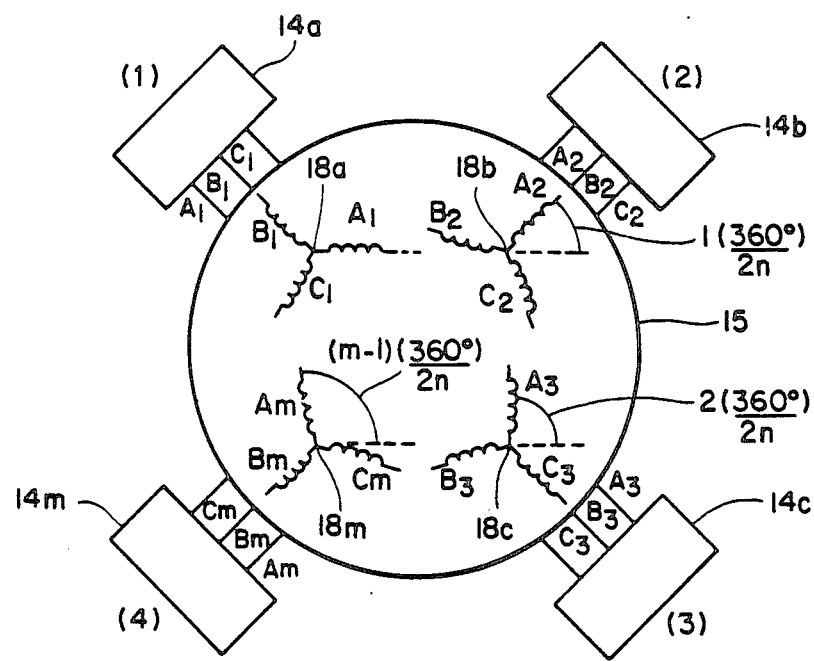
FIG. 2 is a schematic diagram illustrating a preferred form of the invention using three-phase inverters in a drive system wherein the number of phases of the alternating current drive motor is a multiple of three.

Referring to FIGS. 2 and 3, the number of phases, N, is a multiple of three and the inverters 14a–14m are arranged so as to define m three-phase inverters. Thus, each of the phase winding sets 18a–18m comprises a three-phase winding and is shown in wye configuration. In broad form, the number of such three-phase windings may be any number as desired, where m is at least two. Each winding set is displaced 360/2N electrical degrees from one another. Each inverter contains a controlling means (not shown) which preferably includes a plurality of switches, the switches being connected such that no more than one switch is conducting per phase at any given time.

Referring to FIG. 4, a developed view of stator assembly 41 is shown with corresponding outside diameter 42 and inside diameter 43, including a typical stator slot geometry 44 within which is shown the location of the typical stator winding coil sides 45. The alphanumeric designations of the coil sides indicate to which phase within a phase set the coil side belongs and to which phase set of the total winding the coil side belongs. Phase set numbers one through m and phases A, B and C are shown. A negative sign preceding the alphumeric designation indicates a 180 electrical degree phase difference in coil side current flow relative to the corresponding unsigned alphanumeric designation.

The invention considers the optimal arrangement of stator winding coil sides to achieve maximum stator phase current harmonic suppression, given any arbitrary slot geometry, number of internal turns per coil, and number of slots per pole span. The arrangement of the stator winding coil sides in the stator slots of a multiphase, multipole, double layer winding, shall be such that each slot contains coil sides belonging only to the same phase. The objective is achieved by causing each individual coil of the winding to have coil sides which span $N_p$ stator slot pitches. $N_p$ designates the number of slots per pole. The first of the coil sides is placed in slot number i and the second is placed in slot number $(i+N_p)$. This winding possesses the highest value of stator winding slot leakage inductance per phase of all possible pole pitch values, and thereby provides optimal suppression of designated stator phase current time harmonics.

Figure 5:
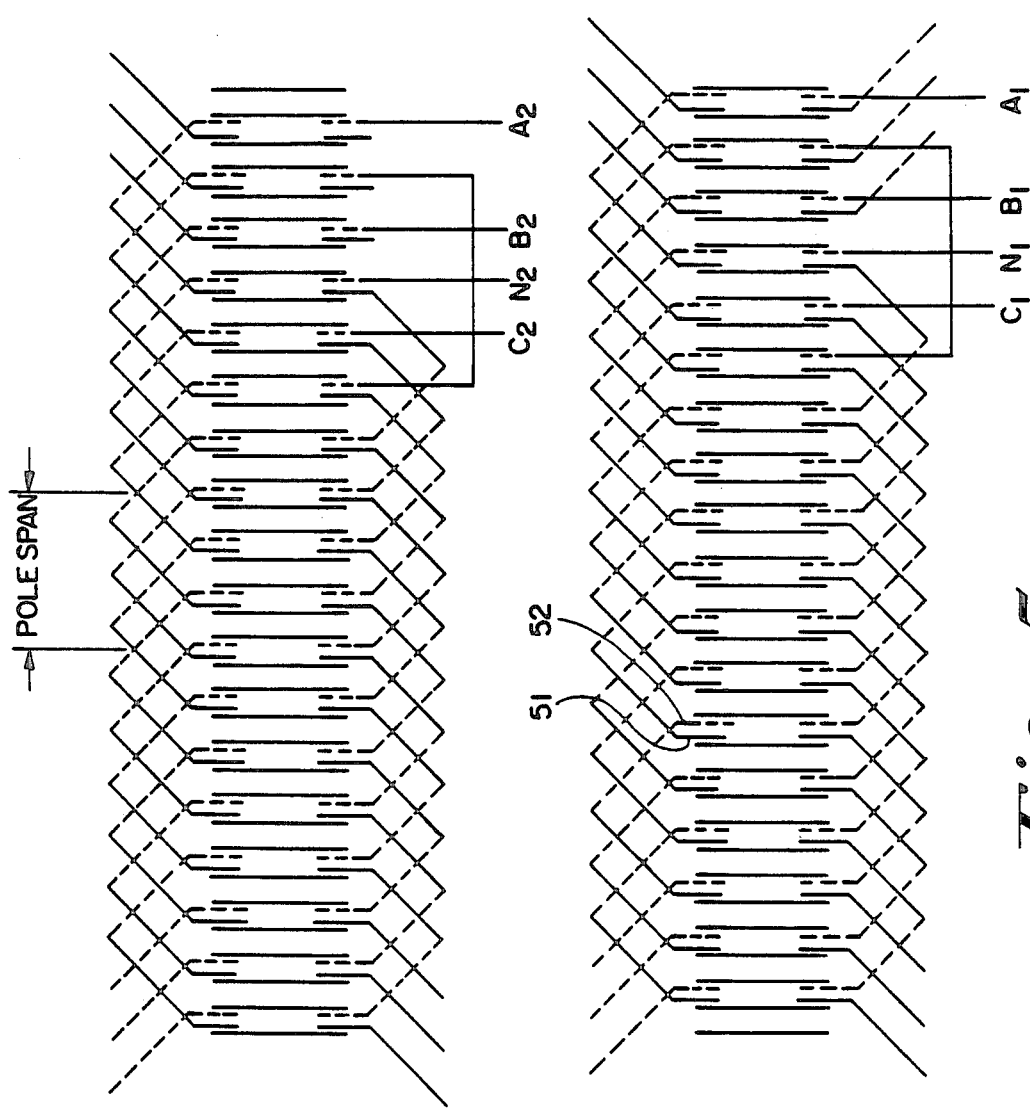
FIG. 5 is a schematic illustration of the winding configurations of a multiphase alternating current drive motor stator winding. (The arrangement shown applies to a six-phase six pole winding.)

FIG. 5 illustrates the manner in which the aforementioned arrangement may be used for a six pole six-phase stator winding which, therefore, consists of two three-phase winding sets. In FIG. 5, the three-phase sets are shown as wye-connected (In this case, therefore, m is equal to two). The symbols $N_1$ and $N_2$ designate the neutral connections of phase sets one and two, respectively. For this specific case the number of slots per pole, Np, is equal to six. Each winding phase set is shown separately although they are in fact both wound on the same slotted stator assembly. Slot numbers 1 through 7 are shown. Each slot contains two coil sides. Coil side 52 located in the bottom of the slot is depicted with a broken line segment. Coil side 51 located in the slot directly above the bottom coil side is depicted with a solid line segment. The extension to any number of phases less than or greater than six is obvious to all those skilled in the art.

A further advantage of the invention includes eliminating the use of multiple inverter switching devices connected in parallel. Prior art devices teach the use of inverter switching devices connected in parallel to avoid exceeding switching device current limits. The invention comprehends the use of a multiphase motor with, in general, m three-phase sets chosen in such a manner so as to avoid exceeding the current limit of a single inverter switching device, thus avoiding the use of switching devices connected in parallel. The number of sets, m is selected using the following relation:

$$\frac{I_{ph} \text{ (peak)}}{m} \leq I_c \text{ (peak)}$$

where:

$m \geq 2$.

$I_{ph}$ (peak) designates the value of the motor instantaneous peak equivalent three-phase current and $I_c$(peak) designates the value of the inverter switching device instantaneous peak current limit. The value of $I_{ph}$ (peak) for a given motor stator geometry is determined analytically assuming that a three-phase motor is excited by a voltage source possessing waveforms of the type depicted in FIG. 3. The value of $I_c$(peak) is a performance characteristics of the type of switching device employed in the inverters. The value of m chosen is the first integer value, beginning with two, which satisfies the aforementioned relation.

It will be apparent to those skilled in the art that numerous modifications of the foregoing electric drive system are within the scope of the invention. The electric drive system can use any multiphase AC motor, including induction motors, synchronous motors and the like. The inverter 14 can preferably be configured as a three-phase half bridge circuit or a three-phase midpoint circuit. Switching devices suitable for use in the electric drive system include bipolar transistors, MOS-IGT, MOSFETs, gate turn-off devices, silicon-controlled rectifiers, and the like.

We claim:

1. An electric drive system comprising:
   a DC power source;
   a multiphase AC motor, said motor having: N stator winding phases, where N is a multiple of three, and m stator winding sets, where m is at least two; said stator winding sets being constructed to provide the highest possible value of stator slot leakage inductance per phase for a given stator geometry;
   wherein the stator winding coil sides located in the stator slots for each winding of each set are wound such that each slot contains coil sides belonging only to the same phase;
   a plurality of inverters connected one each to said winding sets from said DC power source;
   means for controlling said inverters to excite said winding sets successively, and
   a propulsion means driven by said motor.

2. The drive system of claim 1, wherein each coil of its respective stator winding phase has coil sides which span (Np) stator slot pitches, where Np is the number of slots per pole.

3. The drive system of claim 1, wherein said winding sets are displaced 360/N electrical degrees from one another.

4. The drive system of claim 2, wherein said winding sets are displaced 360/2N electrical degrees from one another.

5. The drive system of claim 3, wherein said winding sets are excited successively at 360/N electrical degrees.

6. The drive system of claim 4, wherein said winding sets are excited successively at 360/2N electrical degrees.

7. The drive system of claim 1, wherein said stator winding sets comprise three-phase windings and wherein the magnetic axes of the respective three-phases are connected in a wye and separated by 120 electrical degrees.

8. The drive system of claim 1, wherein said stator winding sets comprise three-phase windings and wherein the magnetic axes of the respective three-pahses are connected in a delta and separated by 120 electrical degrees.

9. The drive system of claim 1, wherein each of said inverters is arranged to define a three-phase half-bridge configuration.

10. The drive system of claim 1, wherein each of said inverters is arranged to define a three-phase midpoint configuration.

11. The drive system of claim 1, wherein said controlling means comprises a plurality of electronic switches, said switches being connected such that no more than one switch is conducting per phase at any given time.

12. The drive system of claim 1,
    wherein m is selected based on the following relationship:

$$\frac{I_{ph} \text{ (peak)}}{m} \leq I_c \text{ (peak)},$$

where
    $m \geq 2$; Iph(peak) is the value of the instantaneous peak equivalent three-phase current, and Ic(peak) is a value of an inverter controlling means instantaneous peak current limit.

* * * * *